US008297091B2

(12) United States Patent
Morales

(10) Patent No.: US 8,297,091 B2
(45) Date of Patent: Oct. 30, 2012

(54) NANOCOMPOSITE COATING FOR HOT METAL FORMING TOOLS

(75) Inventor: Arianna T. Morales, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 12/477,180

(22) Filed: Jun. 3, 2009

(65) Prior Publication Data

US 2010/0307215 A1    Dec. 9, 2010

(51) Int. Cl.
  *B21B 45/02*    (2006.01)
(52) U.S. Cl. .................................. 72/42; 72/46; 72/462
(58) Field of Classification Search .............. 72/46, 47, 72/462, 41, 42; 76/107.1; 508/155
  See application file for complete search history.

(56) References Cited

U.S. PATENT DOCUMENTS

| 2,851,376 | A | * | 9/1958 | Adlassnig | ...................... 427/214 |
| 4,228,670 | A | * | 10/1980 | Corti et al. | ......................... 72/42 |
| 4,559,797 | A | * | 12/1985 | Raymond | ......................... 72/63 |
| 6,253,588 | B1 | | 7/2001 | Rashid et al. | |
| 6,655,181 | B2 | * | 12/2003 | Morales | ............................. 72/42 |
| 6,745,604 | B1 | * | 6/2004 | Morales | ............................. 72/60 |
| 2004/0007044 | A1 | * | 1/2004 | Merle et al. | ....................... 72/462 |
| 2007/0289490 | A1 | * | 12/2007 | Jabado et al. | ............... 106/286.3 |
| 2008/0269086 | A1 | * | 10/2008 | Adhvaryu | ....................... 508/155 |
| 2009/0074522 | A1 | * | 3/2009 | Graham et al. | ................ 508/155 |
| 2009/0181236 | A1 | * | 7/2009 | Anderson et al. | .............. 427/359 |

FOREIGN PATENT DOCUMENTS

| DE | 10127494 | 3/2003 |
| DE | 102006040385 | 1/2007 |
| JP | 59232272 | 12/1984 |

* cited by examiner

*Primary Examiner* — Dana Ross
*Assistant Examiner* — Pradeep C Battula
(74) *Attorney, Agent, or Firm* — Reising Ethington P.C.

(57) ABSTRACT

In one embodiment, a substrate, for example a tool used in hot metalforming operations, is coated with an enamel nanoparticulate graded coating. The nanoparticles in the coating may be boron nitride nanoparticles. The coating may include a first portion adjacent a surface of the substrate, and a second portion adjacent the first portion. The first portion of the coating may have a lower volume fraction of nanoparticles than the second portion. The first portion has excellent adhesion to the surface of the substrate, and the second portion reduces friction and wear. The coated tool may be formed by applying at least one layer of a coating mixture to a surface of the tool and heating the coating mixture. A metal workpiece may be formed into an article by contacting the metal workpiece against the coated surface of the tool.

20 Claims, 2 Drawing Sheets

NANOCOMPOSITE COATING FOR HOT METAL FORMING TOOLS

TECHNICAL FIELD

This disclosure pertains to an enamel nanocomposite coating for the surface of a metal tool intended for hot forming operations and a method of forming the coating. This disclosure also pertains to a nanocomposite graded coating with at least two portions containing varying volume fractions of nanoparticles.

BACKGROUND OF THE INVENTION

In hot forming the working material is heated up to a certain temperature in which plastic deformation of the material is easier to achieve than at room temperature. Then the material is formed using a die, tool, or punch (hot or at room temperature), and a hydraulic and/or mechanical force, or viscous fluid force (hot or at room temperature) to obtain a desired shape and configuration.

Metal articles can be made by hot forming processes that use complementary forming tools in a press under the pressure of a working gas to stretch-form a preheated metal blank, for example an aluminum alloy sheet blank, against forming surfaces on the forming tools. Hot forming processes include, for example, superplastic forming (SPF), forging, warm stamping, plastic blow forming, warm hydroforming, and quick plastic forming (QPF), described in commonly-assigned U.S. Pat. No. 6,253,588.

In hot blow forming, a highly formable sheet, for example an aluminum alloy sheet, is heated, for example at about 500° C., and gripped at peripheral edges between complementary opposing dies. Pressurized air or other fluid is applied against one side of the sheet to stretch it into conformance with the forming surface of one die. The opposing die provides an air chamber on the pressurized side of the aluminum sheet. Both dies may be heated to elevated forming temperatures to maintain the sheet at a predetermined forming temperature for shaping of the sheet. The sheet may first be pressed against one die for pre-shaping, and then blown against the opposing die for finish shaping. Thus, at least one surface of the hot sheet is stretched against and over the forming surface of a die.

Hot forming tools may be coated with a lubricant or release agent to prevent sticking and bonding of the workpiece to the tooling.

SUMMARY OF THE INVENTION

In one embodiment, a substrate is coated with an adherent enamel material containing small particles of a lubricant material. The coating may be applied over any suitable substrate. The enamel may provide durability and adherence to the substrate, while the small particles provide lubricity.

In one embodiment, the substrate is a metal die or tool. In one embodiment, the substrate is a tool steel used in hot forming operations. The coating may be formed over the tool steel by applying at least one coating mixture to a surface of the tool steel and heating the coating mixture(s) at a predetermined temperature for a predetermined time to form the coating over the surface of the tool steel. The nanoparticles in the coating may be boron nitride nanoparticles. In one embodiment, the coating may include a first portion adjacent a surface of the substrate and having excellent adhesion to the surface of the substrate. The first portion of the coating may also be very resistant to compressive stresses, delamination, and wear.

The coating may also include a second portion adjacent the first portion, which provides a wear-resistant, friction-reducing, and lubricious coating. Where the substrate is a tool, for example, the second portion of the coating is in contact with the workpiece. The coated tool steel, for example, may come into sliding engagement with the workpiece. In one embodiment, an aluminum sheet metal workpiece is hot formed into a desired article by contacting a coated tool steel in a hot forming process. The increased lubricity of the second portion of the coating may reduce the amount of lubricant necessary to form parts using the coated tool, and it may contribute to desired forming conditions on the tool surface for extended periods of time.

The lubricity of the coating may be controlled and tailored to specific applications by modifying the volume fraction of the nanoparticles therein. The volume fraction of nanoparticles in the first portion of the coating may be less than the volume fraction of nanoparticles in the second portion of the coating. In one embodiment, the first portion may not contain any nanoparticles, and the volume fraction of nanoparticles in the second portion may be up to about ten percent. In another embodiment, the volume fraction of nanoparticles in the first portion of the coating may range from about zero to about eight percent, and the volume fraction of nanoparticles in the second portion may range from about two to about ten percent.

The coating may include nanoparticles and enamel. The enamel may be a borosilicate glass or any other suitable enamel. In one embodiment, two layers may be applied over the surface of the substrate. The first layer may include enamel but no nanoparticles. Or the first layer may include enamel and a first volume fraction of nanoparticles, for example up to eight percent. The second layer may include enamel and a second volume fraction of nanoparticles larger than the first volume fraction of nanoparticles. For example, the second volume fraction of nanoparticles may be about two to about ten percent. The constituents of an enamel composition and/or the nanoparticles may be mixed with water to form the mixture or slurry. The first layer may be formed by depositing or applying a suitable mixture or slurry over the surface of the substrate. The second layer may be formed by depositing or applying a suitable mixture or slurry over the first layer. Then the first and second layers may be heated to cure the layers.

In one embodiment, a single layer only may be formed. The mixture or slurry containing nanoparticles may be deposited or applied over the surface of the substrate, which is then heated to melt the mixture or slurry. During the curing process, a gradient of nanoparticles may develop to form the graded coating. The gradient may be controlled by the time and temperature used to heat or fire the substrate, as well as the amount of nanoparticles in the mixture or slurry. Or the nanoparticles may remain relatively static to form a coating having a substantially uniform concentration of nanoparticles throughout.

DESCRIPTION OF PREFERRED EMBODIMENTS

Figure 1:
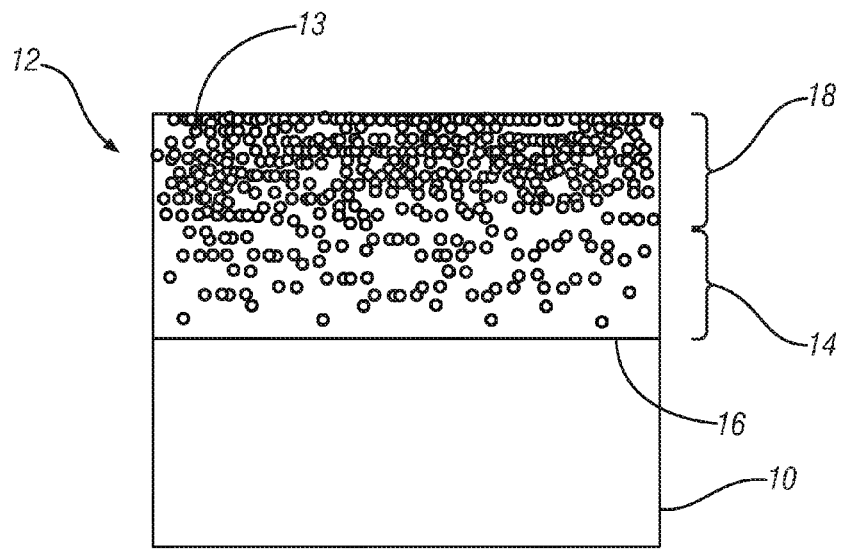
FIG. 1 illustrates a graded coating over a substrate according to one embodiment of the invention.

One embodiment includes a substrate 10 having a coating 12, as shown in FIG. 1. The coating 12 may include nanoparticles 13. In one embodiment, the nanoparticles 13 may be boron nitride nanoparticles. The coating 12 may be graded or it may have a relatively uniform concentration of nanoparticles throughout the coating. In one embodiment, the coating 12 may include at least two portions. Still referring to FIG. 1, a first portion 14 of the coating 12 may be located adjacent a surface 16 of the substrate 10 and a second portion 18 of the coating 12 may be located adjacent the first portion 14. The first portion 14 may include an enamel and either no nanoparticles or a first volume fraction of nanoparticles. The second portion 18 may include an enamel and a second volume fraction of nanoparticles larger than the first volume fraction. In one embodiment, the first and second portions 14, 18 are two distinct layers. In another embodiment, the first and second portions 14, 18 are not two distinct layers. In yet another embodiment, the coating 14 may include only one portion having substantially uniform concentration of nanoparticles throughout the coating (not shown). The enamel may be any suitable enamel.

The lubricity of the coating 12 may be controlled and tailored to specific applications by modifying the volume fraction of the nanoparticles 13 in the coating 12. In one embodiment, the first volume fraction of nanoparticles in the first portion 14 may be up to about eight percent. Or the first layer 14 may contain no nanoparticles. In another embodiment, the second volume fraction of the nanoparticles in the second portion 18 may range from about two to about ten percent.

In one embodiment, about 90 percent of the nanoparticles are smaller than about 15 nanometers in diameter with an average particles size of about 5 to about 7 nanometers. In another embodiment, the average size of the nanoparticles may range from 3 nanometers to 100 nanometers in diameter. In one embodiment, the thickness of the coating 20 may be about 5 micrometers to about 40 micrometers. In another embodiment, the thickness of the coating 20 may be about 5 micrometers to about 30 micrometers.

In one embodiment, the enamel in the coating 12 may be a borosilicate glass. Enamels comprising borosilicate are highly complex in their formulation, with physical and mechanical properties that are determined principally by their composition. The borosilicate glass may be prepared from a combination comprising at least one of quartz ($SiO_2$), borax (anhydrous formula $Na_2B_4O_7$), boric acid ($H_3BO_3$), potassium nitrate ($KNO_3$), sodium silicofluoride ($Na_2SiF_6$), and manganese dioxide ($MnO_2$), and optionally further comprising titanium dioxide ($TiO_2$), antimony oxide ($Sb_2O_3$), cobalt oxide [cobaltous oxide (CoO), cobalto-cobaltic oxide ($CO_3O_4$) and/or cobaltic oxide ($CO_2O_3$)], or barium oxide (BaO).

In another embodiment, the enamel in the coating 12 may be prepared from a composition containing at least one of quartz, borax, boric acid, potassium nitrate, sodium silicofluoride, and manganese dioxide, and optionally at least one of titanium dioxide, antimony oxide, cobalt oxide [cobaltous oxide, cobalto-cobaltic oxide and/or cobaltic oxide], or barium oxide. In one embodiment, suitable ranges for the pre-fired constituents of the enamel composition (not including the nanoparticles) are about 39 to about 52 weight percent quartz, about 15 to about 24 weight percent dehydrated borax, about 6 to about 12 weight percent boric acid, about 5 to about 8 weight percent potassium nitrate, about 3 to about 6 weight percent sodium silicofluoride, about 3 to about 12 weight percent manganese dioxide, and optionally one or more of these components: up to about 15 weight percent titanium dioxide, up to about 3 weight percent antimony oxide, up to about 1 weight percent cobalt oxide, and up to about 1 weight percent barium oxide.

In one embodiment, the nanoparticles 13 may be mixed into a coating composition to form a mixture or slurry. For example, the dry constituents of an enamel composition may be mixed with water and the nanoparticles 13 to form an aqueous dispersion of the dry constituents and nanoparticles as a slurry, in accordance with known practices. Then the mixture or slurry may be deposited or applied over the surface 16 of the substrate 10, for example but not limited to, by air or electrostatic liquid spray. Then the substrate 10 my be heated or fired at an elevated temperature, for example in a furnace or oven. Or the heating may occur using a torch or laser. The heating or firing nay be at a temperature, for example, of about 700° C. to about 1200° C., or of about 750° C. to about 900° C., to melt the mixture or slurry. The temperature of heating may correspond to the temperature of fusion of the enamel. The time of firing may depend on the thickness of the layer(s) and the thickness of the substrate. During the curing process, a gradient of nanoparticles develops to form the graded coating 12. The gradient may be controlled by the time and temperature used to heat or fire the substrate 10, as well as the amount of nanoparticles in the mixture or slurry. In another embodiment, the nanoparticles do not migrate and a non-graded coating is formed having a substantially uniform concentration of nanoparticles throughout the coating.

In another embodiment, a first mixture or slurry may be deposited or applied over the surface 16 of the substrate 10 to form a first layer, and then a second mixture or slurry may be deposited over the first mixture or slurry to form a second layer. The deposition of the second mixture or slurry may occur immediately after the deposition of the first mixture or slurry, or after some time has passed. Then the first and second layers may be heated to cure the layers. The first layer may include enamel but no nanoparticles. Or the first layer may include enamel and a first volume fraction of nanoparticles, for example up to eight percent. The second layer may include enamel and a second volume fraction of nanoparticles larger than the first volume fraction of nanoparticles. For example, the second volume fraction of nanoparticles may be about two to about ten percent.

The final composition of the coating will depend in part on the firing conditions, but may include the above-noted dry constituents of the slurry with the exception of boric oxide ($B_2O_3$), which is produced during firing from the boric acid component of the slurry. Suitable constituent ranges for the final coating (not including the nanoparticles) are about 39 to about 52 weight percent quartz, about 15 to about 24 weight percent borax (based on the anhydrous formula), about 7 to about 12 weight percent boric oxide, about 5 to about 12 weight percent potassium nitrate, about 3 to about 8 weight percent sodium silicofluoride, about 3 to about 12 weight percent manganese dioxide, and optionally one or more of: up to about 12 weight percent titanium dioxide, up to about 8 weight percent antimony oxide, up to about 1 weight percent cobalt oxide, and up to about 1 weight percent barium oxide.

In another embodiment, the final enamel composition (not including the nanoparticles) may be a mixture of about 46.5 weight percent of quartz, about 21 weight percent of borax (based on its anhydrous formula $Na_2B_4O_7$), about 7.5 weight percent of boric acid, about 6 weight percent of potassium nitrate, about 5 weight percent of sodium silicofluoride, about 11.5 weight percent of manganese dioxide, and about 2.5 weight percent of antimony oxide.

In one embodiment of the invention, the substrate 10 may be a tool, for example a hot forming tool. Thus, the first portion 14 of the coating 12 may be adjacent the surface of the tool, and the second portion 18 of the coating 12 may be adjacent the first portion 14. The tool surface may be any suitable material, for example but not limited to steel. The coating 12 may be formed over the tool surface at any suitable time before the tool is used in a hot forming operation. Examples of hot forming operations include, but are not limited to, superplastic forming (SPF), quick plastic forming (QPF), forging, warm stamping, and plastic blow forming.

The coating 12 may prevent metal-to-metal contact between the tool surface and the forming material. Furthermore, the coating 12 may reduce the need to resurface the tool, which may increase productivity and reduce metal finishing costs. The coating 12 may increase the surface quality of parts formed using the tool. The first portion 14 of the coating 12 may have excellent adhesion to the substrate, for example a tool surface. The first portion 14 may also be very resistant to compressive stresses, delamination, and wear. The second portion 18 may provide a wear-resistant, friction-reducing, and lubricious coating that is in contact with the workpiece. The second portion 18 thus may maintain ideal forming conditions on the tool surface for extended periods of time. The increased lubricity of the second portion 18 may reduce the amount of lubricant needed to form parts using a coated tool.

Figure 2:
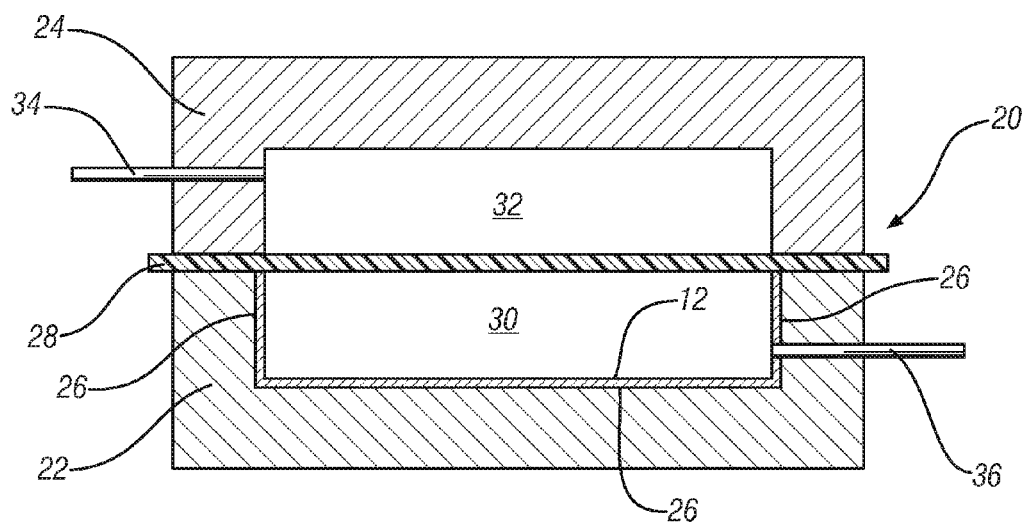
FIG. 2 illustrates a tool having forming surface with a graded coating according to one embodiment of the invention prior to a hot forming of a sheet metal workpiece.
Figure 3:
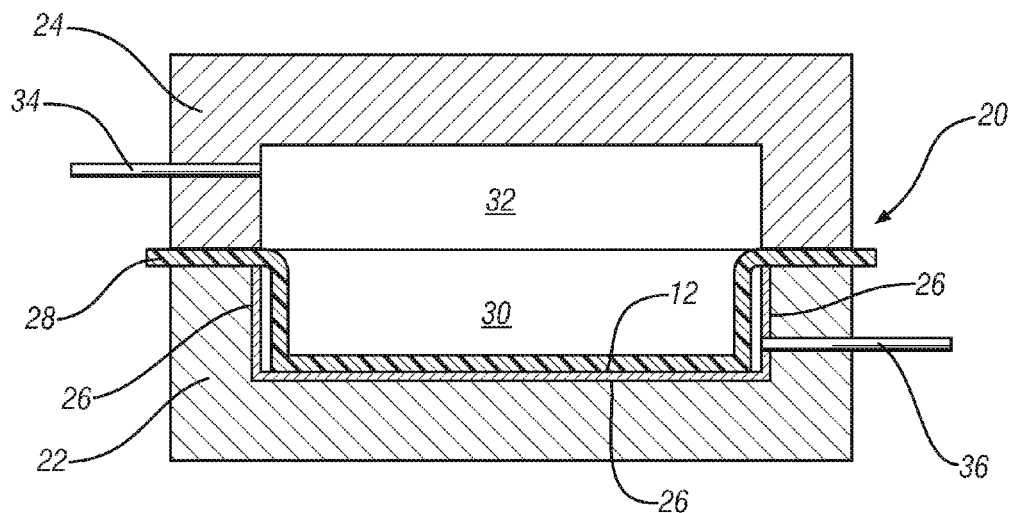
FIG. 3 illustrates a portion of a tool having a graded coating according to one embodiment of the invention after a sheet metal workpiece has been in contact with the forming surface with the graded coating.

The coating 12 may be applied over any suitable substrate, for example a tool. In one embodiment, the coating 12 may be applied over a QPF tool. FIGS. 2 and 3 show tooling 20 for a QPF process, comprising a lower tool 22 and an upper tool 24. The graded coating 12 may be formed over a forming surface 26 of the lower tool 22, and the coating 12 may have first and second portions as described above. The coating 12 may be formed over the entire forming surface 26 or the coating 12 may be formed only over a portion of the forming surface 26.

FIGS. 2 and 3 also show a workpiece 28 initially in the form of a sheet that is deformed with the tooling 20 to produce a desired article. Tools 22 and 24 each have a cavity 30 and 32, respectively. As is conventional with the QPF process, the tools 22 and 24 may be made of nodular iron, low carbon or low alloy steel, or a tool steel such as AISI P20, though any suitable material could be used. Those skilled in the art will appreciate that FIGS. 2 and 3 are merely intended to schematically represent QPF tooling, and that the workpiece and tooling could differ considerably from that shown.

As apparent from FIG. 3, the surface of the cavity 30 of the lower tool 22 is generally the forming surface for the QPF process, i.e., against which the workpiece 28 is deformed. The workpiece 28 may be formed of any material capable of exhibiting "superplasticity," meaning that the material exhibits exceptional ductility under appropriate conditions, including a very fine grain size and under high processing temperatures. Examples of suitable materials for the workpiece 28 include titanium and aluminum alloys.

As depicted in FIG. 2, the workpiece 28 is initially clamped between the tools 22 and 24, preferably effecting a gas-tight seal. Once the desired process temperature is reached, a non-reactive gas (e.g., argon) is pumped into the cavity 32 of the upper tool 24 through an inlet 34, gradually forcing the workpiece 28 down into the cavity 30 of the lower tool 22 at a controlled strain rate. The lower tool 22 is equipped with an outlet 36 to allow venting of gas from the lower cavity 30. As represented in FIG. 3, the workpiece 28 is deformed by the pressure of the gas (blow-formed), and eventually conforms to at least a portion of the forming surface 26 of the lower tool 22. As the workpiece 28 is deformed, the workpiece 28 comes into contact with the coating 12 over the forming surface 26 of the lower tool 22. The workpiece 28 may slide, stretch, or push against the coating 12 and/or the forming surface 26. In other words, the metal workpiece 28 contacts the coating 12 as the workpiece moves relative to the forming surface 26. The coating 12 may prevent metal-to-metal contact between the surface 26 and the workpiece 28, and may increase the surface quality of the formed workpiece 28. Thereafter, the workpiece 28 is removed from the tooling 20, and the next workpiece loaded.

Experiments were conducted to test the wear resistance of a coated substrate. The coated samples had dimensions of 95 mm by 59 mm. The tooling material used in the samples was P20 tool steel. The specimens were polished with 1 μm polish solution before and after each test.

The tribological properties of the coated samples were measured using a Plint TE-77 high frequency friction machine. The machine was used to evaluate the effect of different lubricants on the tribological behavior of an aluminum/steel tool pair in sliding contact. The test involved contact between two flat specimens, the upper steel (simulating the forming tool) and the lower lubed aluminum sheet. The upper steel slides in reciprocating motion against the fixed aluminum sheet. The data acquisition system recorded data every 0.1 second. The following test conditions were used to evaluate the coated samples: normal force of 50 N, duration of the test from tens of seconds to 50 minutes depending on the lubricant, frequency of 0.1 Hz, and temperature of 450° C.

The short time data collection and the low sliding speed used allowed the observation of the friction behavior of the tribological system during each single slide (15 mm stroke), the highly oscillating behavior of the friction coefficient (FC), and the amplitude magnitude of the friction coefficient at each particular stroke. The data acquisition system automatically recorded friction coefficient, electric contact potential (CP), load, temperature and frequency during each of the tests. Three tests per each condition and lubricant were conducted.

Figure 4:
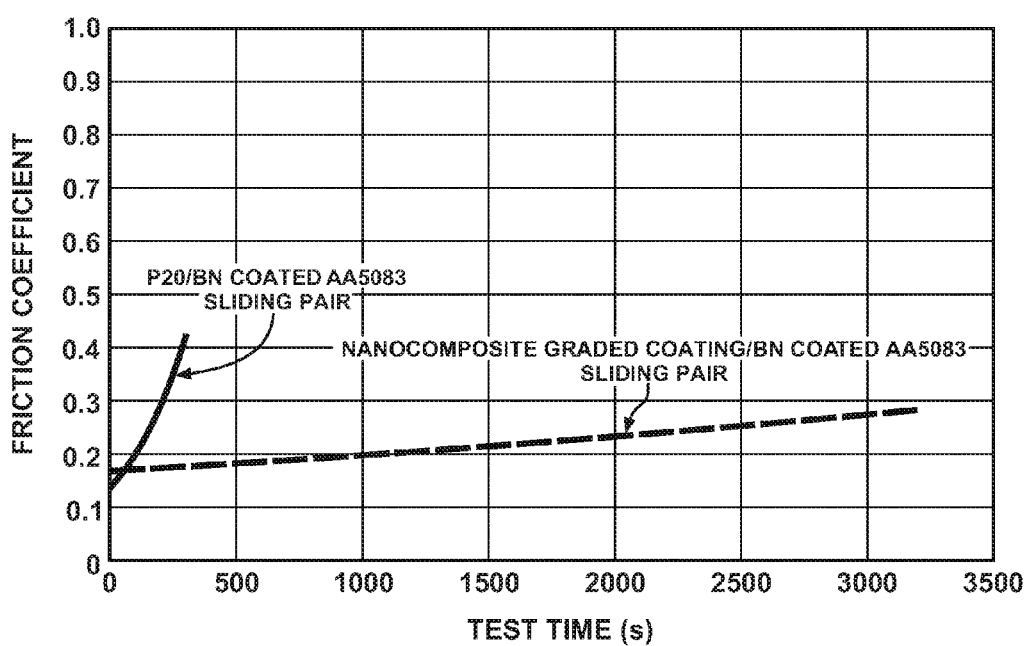
FIG. 4 shows the improvement in tribological properties for coated samples compared to uncoated samples

The results of the tribological testing are given in FIG. 4. FIG. 4 shows the friction coefficient over time for a substrate having a nanocomposite graded coating and for a non-coated substrate. The line for each data set represents the oscillating friction coefficient curves for three experiments fit to fourth-order polynomial curves, which were found to be the best fit to obtain the average friction coefficient. The dashed line is for a sliding pair including a die sample (P20 tool steel) coated with a nanocomposite graded coating including an enamel and five volume percent boron nitride nanoparticles, sliding against a AA5083 sheet metal sample lubricated with a boron nitride coating approximately 9 microns thick. The solid line is for the control sliding pair including a bare die sample (P20 tool steel) sliding against an AA5083 sheet metal sample lubricated with a boron nitride coating approximately 9 microns thick.

The results shown in FIG. 4 indicate that the time-to-contact increases 10 times for the tool coated samples compared to the non-coated control tool samples. The time-to-contact is the time from the beginning of the test to the time when the electric contact potential drops sharply to zero. This corresponds to the first metal-to-metal contact between the lubricated aluminum plate and the die materials. The friction coefficient at time-to-contact is the friction coefficient at the time when the contact potential reaches zero, and it corresponds to the lubrication regime change from a relatively steady state to a sudden increase of the friction coefficient.

This indicates that tribological failure has occurred due to lube exhaustion or increased asperity contact.

The results shown in FIG. 4 also indicate that the steady state friction coefficient (SSFC) is reduced by more than half for the coated samples compared to the non-coated control samples. The SSFC is the average value of the coefficient of friction before its steep increase. The steady state period in the experiment is defined as the time from the beginning of sliding to the point when the contact potential drops to zero.

The practice of the invention has been illustrated with certain embodiments but the scope of the invention is not limited to such examples.

The invention claimed is:

1. A coated tool for hot metal forming comprising:
   a tool for hot metal forming;
   a layer over a forming surface of the tool comprising a borosilicate glass enamel and an amount of lubricating boron nitride nanoparticles distributed non-uniformly in the layer,
   in which one side of the layer adheres to the tool and an opposing side of the layer is for lubricating contact with a workpiece being formed in a hot metal forming operation, and
   in which the amount of lubricating boron nitride nanoparticles in the layer increases throughout the layer to reach a maximum volume fraction at the opposing side of the layer for lubricating contact with the workpiece being formed.

2. A coated tool for hot metal forming as set forth in claim 1 in which the maximum volume fraction of boron nitride nanoparticles is ten percent.

3. A coated tool for hot metal forming comprising:
   a tool for hot metal forming having a forming surface for engagement with a metal workpiece being formed;
   a first portion of coating adjacent and adherent to the forming surface of the tool and comprising an enamel and a first volume fraction of lubricating boron nitride nanoparticles, in which the first volume fraction is up to eight percent; and
   a second portion of coating adjacent the first portion of coating and comprising the enamel and a second volume fraction of lubricating boron nitride nanoparticles larger than the first volume fraction, in which the second volume fraction is two to ten percent.

4. A coated tool for hot metal forming as set forth in claim 3 wherein the second volume fraction is about 5 percent.

5. A coated tool for hot metal forming as set forth in claim 3 wherein the size of the boron nitride nanoparticles range from 3 nm to 100 nm.

6. A coated tool for hot metal forming as set forth in claim 3 wherein the combined thickness of the first and second portions of coating is 5 micrometers to 40 micrometers.

7. A coated tool for hot metal forming as set forth in claim 3 wherein the enamel is a borosilicate glass.

8. A coated tool for hot metal forming as set forth in claim 3 wherein the enamel is prepared from an enamel composition comprising quartz, borax, boric acid, potassium nitrate, sodium silicofluoride, and manganese dioxide.

9. A coated tool for hot metal forming as set forth in claim 8 wherein the enamel composition further comprises at least one of titanium dioxide, antimony oxide, cobalt oxide, or barium oxide.

10. A coated tool for hot metal forming as set forth in claim 3 wherein the enamel is prepared from an enamel composition comprising:
    from 39 to 52 percent by weight quartz;
    from 15 to 24 percent by weight borax (on an anhydrous basis);
    from 6 to 12 percent by weight boric acid;
    from 5 to 8 percent by weight potassium nitrate;
    from 3 to 6 percent by weight sodium silicofluoride; and
    from 3 to 12 percent by weight manganese dioxide.

11. A coated tool for hot metal forming as set forth in claim 10 wherein the enamel composition further comprises at least one of:
    up to 15 percent by weight titanium dioxide;
    up to 3 percent by weight antimony oxide;
    up to 1 percent by weight cobalt oxide; and
    up to 1 percent by weight barium oxide.

12. A coated tool for hot metal forming as set forth in claim 3 wherein the enamel is prepared from an enamel composition comprising:
    from 39 to 52 percent by weight quartz;
    from 15 to 24 percent by weight borax (on an anhydrous basis);
    from 7 to 12 percent by weight boric acid;
    from 5 to 8 percent by weight potassium nitrate;
    from 3 to 8 percent by weight sodium silicofluoride; and
    from 3 to 12 percent by weight manganese dioxide.

13. A coated tool for hot metal forming as set forth in claim 12 wherein the enamel composition further comprises at least one of:
    up to 12 percent by weight titanium dioxide;
    up to 8 percent by weight antimony oxide;
    up to 1 percent by weight cobalt oxide; and
    up to 1 percent by weight barium oxide.

14. A coated tool for hot metal forming as set forth in claim 3 wherein the enamel is prepared from an enamel composition comprising:
    46.5 percent by weight quartz;
    21 percent by weight borax (on an anhydrous basis);
    7.5 percent by weight boric acid;
    6 percent by weight potassium nitrate;
    5 percent by weight sodium silicofluoride;
    11.5 percent by weight manganese dioxide; and
    2.5 percent by weight antimony oxide.

15. A coated tool for hot metal forming comprising:
    a tool for hot metal forming having a forming surface for engagement with a metal workpiece being formed;
    a first portion of coating adjacent the forming surface of the tool and comprising an adherent enamel and a first volume fraction of lubricating boron nitride nanoparticles; and
    a second portion of coating adjacent the first portion of coating and comprising the adherent enamel and a second volume fraction of lubricating boron nitride nanoparticles larger than the first volume fraction.

16. A coated tool for hot metal forming as set forth in claim 15 wherein the size of the boron nitride nanoparticles range from 3 nm to 100 nm.

17. A coated tool for hot metal forming as set forth in claim 15 wherein the combined thickness of the first and second portions of coating is 5 micrometers to 40 micrometers.

18. A coated tool for hot metal forming as set forth in claim 15 wherein the enamel is a borosilicate glass.

19. A coated tool for hot metal forming as set forth in claim 15 wherein the enamel is prepared from an enamel composition comprising quartz, borax, boric acid, potassium nitrate, sodium silicofluoride, and manganese dioxide.

20. A coated tool for hot metal forming as set forth in claim 19 wherein the enamel composition further comprises at least one of titanium dioxide, antimony oxide, cobalt oxide, or barium oxide.

* * * * *